US012690044B2

(12) United States Patent (10) Patent No.: US 12,690,044 B2
Li et al. (45) Date of Patent: Jul. 21, 2026

(54) FREQUENCY DOMAIN RESOURCE ALLOCATION METHOD AND DEVICE

(71) Applicant: VIVO MOBILE COMMUNICATION CO., LTD., Dongguan (CN)

(72) Inventors: Gen Li, Dongguan (CN); Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 467 days.

(21) Appl. No.: 17/981,904

(22) Filed: Nov. 7, 2022

(65) Prior Publication Data

US 2023/0073686 A1 Mar. 9, 2023

Related U.S. Application Data

(63) Continuation of application No. PCT/CN2021/091860, filed on May 6, 2021.

(30) Foreign Application Priority Data

May 8, 2020 (CN) .......................... 202010383541.2

(51) Int. Cl.
$H04W$ 72/23 (2023.01)
$H04L$ 5/00 (2006.01)

(52) U.S. Cl.
CPC ........... *H04W 72/23* (2023.01); *H04L 5/0094* (2013.01)

(58) Field of Classification Search
CPC ..... H04L 5/0094; H04L 5/001; H04L 5/0053;

H04L 5/0092; H04L 5/0098; H04W 72/23; H04W 72/232; H04W 72/0453; H04W 72/0457; H04W 72/53
See application file for complete search history.

(56) References Cited

U.S. PATENT DOCUMENTS 10,284,404 B2 5/2019 Park et al.
10,624,093 B2 4/2020 Shin et al.
(Continued)

FOREIGN PATENT DOCUMENTS

CN 103733560 A 4/2014
CN 108934075 A 12/2018
(Continued)

OTHER PUBLICATIONS

Samsung, "Remaining issues on sPDSCH design", 3GPP TSG RAN WG1 Meeting 90bis, Oct. 2017, pp. 1-2, Prague, CZ.
(Continued)

*Primary Examiner* — Benjamin H Elliott, IV
(74) *Attorney, Agent, or Firm* — The Webb Law Firm

(57) ABSTRACT

A frequency domain resource allocation method includes: receiving first downlink control information for scheduling a plurality of carriers, cells, or bandwidth parts; and obtaining frequency domain resources of a terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

20 Claims, 5 Drawing Sheets

(56) References Cited

U.S. PATENT DOCUMENTS

| | | | | |
|---|---|---|---|---|
| 2013/0176952 A1* | 7/2013 | Shin | ................... | H04L 5/0044 |
| | | | | 370/329 |
| 2014/0044085 A1* | 2/2014 | Hong | ............... | H04L 5/0053 |
| | | | | 370/329 |
| 2016/0227541 A1 | 8/2016 | Damnjanovic et al. | | |
| 2018/0084551 A1* | 3/2018 | Shin | ................... | H04L 5/0092 |
| 2018/0279281 A1* | 9/2018 | Li | ................... | H04W 72/0453 |
| 2018/0343154 A1* | 11/2018 | Park | ................... | H04L 5/0007 |
| 2019/0013903 A1* | 1/2019 | Zhang | ............... | H04L 1/1854 |
| 2019/0215212 A1* | 7/2019 | Park | ................... | H04L 5/0007 |
| 2020/0068610 A1* | 2/2020 | Li | ................... | H04W 72/23 |
| 2020/0344031 A1* | 10/2020 | Shao | ................... | H04W 72/56 |
| 2020/0351668 A1* | 11/2020 | Kundu | ............. | H04W 74/0808 |
| 2020/0404667 A1* | 12/2020 | Khoshnevisan | ...... | H04W 72/23 |
| 2022/0015015 A1* | 1/2022 | Kim | ................... | H04W 48/12 |
| 2022/0086894 A1* | 3/2022 | Papasakellariou | .... | H04L 5/0053 |
| 2022/0210844 A1* | 6/2022 | MolavianJazi | ....... | H04L 5/0048 |
| 2023/0071767 A1* | 3/2023 | Zhou | ................... | H04L 1/1854 |
| 2023/0073686 A1* | 3/2023 | Li | ................... | H04L 5/0092 |
| 2023/0091578 A1* | 3/2023 | Zhang | ................... | H04L 5/0094 |
| | | | | 370/329 |

FOREIGN PATENT DOCUMENTS

| | | |
|---|---|---|
| CN | 110034864 A | 7/2019 |
| CN | 110324897 A | 10/2019 |

OTHER PUBLICATIONS

LG Electronics, "Remaining issues on bandwidth part operation", 3GPP TSG RAN WG1 Meeting AH 1801, Vancouver, Canada, Jan. 22-26, 2018, R1-1800384.

Nokia et al., "On resource allocation in frequency domain for PDSCH and PUSCH in nr", 3gpp tsg ran WG1 Ad Hoc Meeting #2, Qingdao, China, Jun. 27-30, 2017, R1-1710989.

* cited by examiner

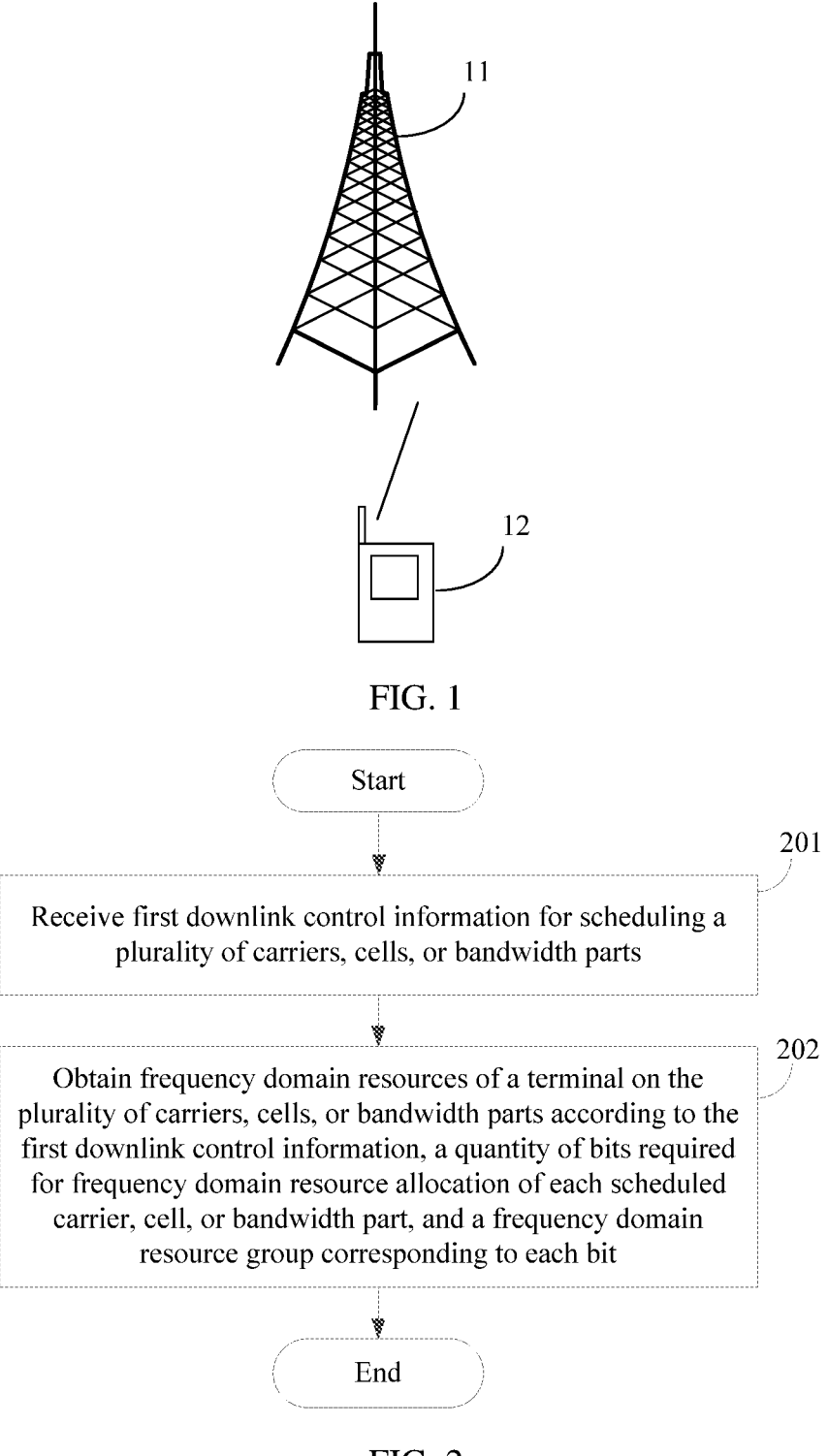

FIG. 1

Start

201

Receive first downlink control information for scheduling a plurality of carriers, cells, or bandwidth parts

202

Obtain frequency domain resources of a terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit End

FIG. 2

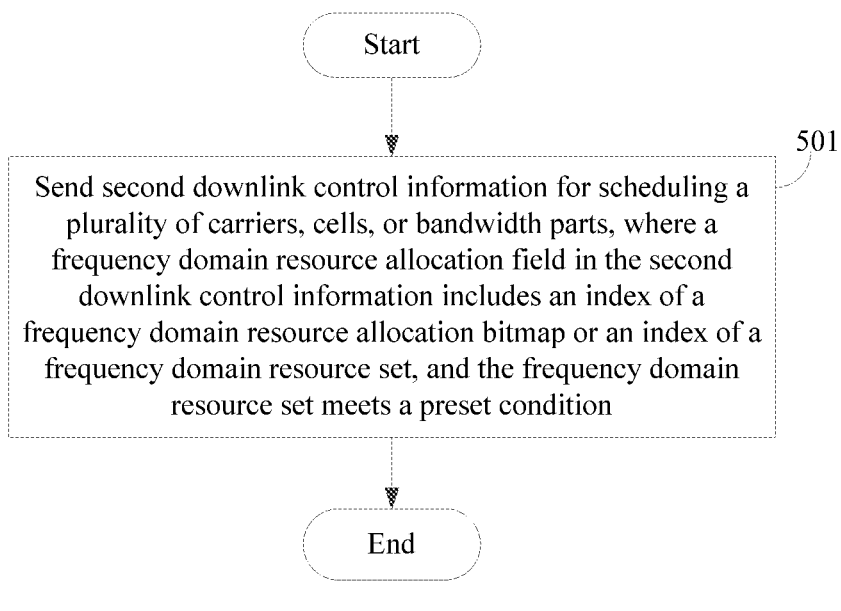

Start

Send second downlink control information for scheduling a
plurality of carriers, cells, or bandwidth parts, where a
frequency domain resource allocation field in the second
downlink control information includes an index of a
frequency domain resource allocation bitmap or an index of a
frequency domain resource set, and the frequency domain
resource set meets a preset condition

501

End

Terminal

First receiving
module
601

First processing
module
602

FIG. 6

FREQUENCY DOMAIN RESOURCE ALLOCATION METHOD AND DEVICE

CROSS-REFERENCE TO RELATED APPLICATIONS

This application is a Bypass Continuation Application of PCT/CN2021/091860 filed May 6, 2021, which claims priority to Chinese Patent Application No. 202010383541.2 filed May 8, 2020, the disclosures of which are hereby incorporated by reference in their entirety.

BACKGROUND OF THE INVENTION

Field of the Invention

Embodiments of the present application relate to the field of communications technologies, and in particular, to a frequency domain resource allocation method and a device.

Description of Related Art

In a current new radio (NR) system, a plurality of carriers cannot be scheduled by using one piece of downlink control information (DCI). In a dynamic spectrum sharing (DSS) scenario, scheduling a plurality of carriers by using one piece of DCI can effectively reduce overheads of a physical downlink control channel (PDCCH).

SUMMARY OF THE INVENTION

According to a first aspect, an embodiment of the present application provides a frequency domain resource allocation method, performed by a terminal and including:

receiving first downlink control information for scheduling a plurality of carriers, cells, or bandwidth parts; and obtaining frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

According to a second aspect, an embodiment of the present application provides a frequency domain resource allocation method, performed by a network device and including:

sending first downlink control information for scheduling a plurality of carriers, cells, or bandwidth parts, where the first downlink control information is used to instruct a terminal to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

According to a third aspect, an embodiment of the present application provides a frequency domain resource allocation method, performed by a terminal and including:

receiving second downlink control information for scheduling a plurality of carriers, cells, or bandwidth parts; and obtaining frequency domain resources of the terminal on the plurality of carriers, cells, or bandwidth parts according to a frequency domain resource allocation field in the second downlink control information, where the frequency domain resource allocation field includes an index corresponding to a frequency domain resource allocation bitmap or an index corresponding to a frequency domain resource set, and the frequency domain resource set meets a preset condition.

According to a fourth aspect, an embodiment of the present application provides a frequency domain resource allocation method, performed by a network device and including:

sending second downlink control information for scheduling a plurality of carriers, cells, or bandwidth parts, where a frequency domain resource allocation field in the second downlink control information includes an index corresponding to a frequency domain resource allocation bitmap or an index corresponding to a frequency domain resource set, and the frequency domain resource set meets a preset condition.

According to a fifth aspect, an embodiment of the present application provides a terminal, including:

a first receiving module, configured to receive first downlink control information for scheduling a plurality of carriers, cells, or bandwidth parts; and a first processing module, configured to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

According to a sixth aspect, an embodiment of the present application provides a network device, including:

a first sending module, configured to send first downlink control information for scheduling a plurality of carriers, cells, or bandwidth parts, where the first downlink control information is used to instruct a terminal to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

According to a seventh aspect, an embodiment of the present application provides a terminal, including:

a second receiving module, configured to receive second downlink control information for scheduling a plurality of carriers, cells, or bandwidth parts; and a thirteenth processing module, configured to obtain frequency domain resources of the terminal on the plurality of carriers, cells, or bandwidth parts according to a frequency domain resource allocation field in the second downlink control information, where the frequency domain resource allocation field includes an index of a frequency domain resource allocation bitmap or an index of a frequency domain resource set, and the frequency domain resource set meets a preset condition.

According to an eighth aspect, an embodiment of the present application provides a network device, including:

a second sending module, configured to send second downlink control information for scheduling a plurality of carriers, cells, or bandwidth parts, where a frequency domain resource allocation field in the second downlink control information includes an index of a frequency domain resource allocation bitmap or an index of a frequency domain resource set, and the frequency domain resource set meets a preset condition.

According to a ninth aspect, an embodiment of the present application provides a communications device, including a processor, a memory, and a program stored in the memory and executable on the processor, where when the program is executed by the processor, the steps of the frequency domain resource allocation method in the first aspect, the second aspect, the third aspect, or the fourth aspect are implemented.

According to a tenth aspect, an embodiment of the present application provides a non-transitory computer-readable storage medium. The non-transitory computer-readable storage medium stores a program, and when the program is executed by a processor, the steps of the frequency domain resource allocation method in the first aspect, the second aspect, the third aspect, or the fourth aspect are implemented.

According to an eleventh aspect, an embodiment of this application provides a chip. The chip includes a processor and a communications interface, the communications interface is coupled to the processor, and the processor is configured to execute a program or an instruction to implement the method in the first aspect, the second aspect, the third aspect, or the fourth aspect.

BRIEF DESCRIPTION OF DRAWINGS

It becomes clear for persons skilled in the art to learn various other advantages and benefits by reading description of the following implementations. Accompanying drawings are merely used for showing the implementation manners, but not considered as a limitation on the present application. In all accompanying drawings, a same reference symbol is used to indicate a same part. In the accompanying drawings:

FIG. 1 is a schematic architectural diagram of a communications system according to an embodiment of the present application;

FIG. 2 is a first flowchart of a frequency domain resource allocation method according to an embodiment of the present application;

FIG. 5 is a fourth flowchart of a frequency domain resource allocation method according to an embodiment of the present application;

FIG. 6 is a first schematic diagram of a terminal according to an embodiment of the present application;

DESCRIPTION OF THE INVENTION

Figures 3, 4:
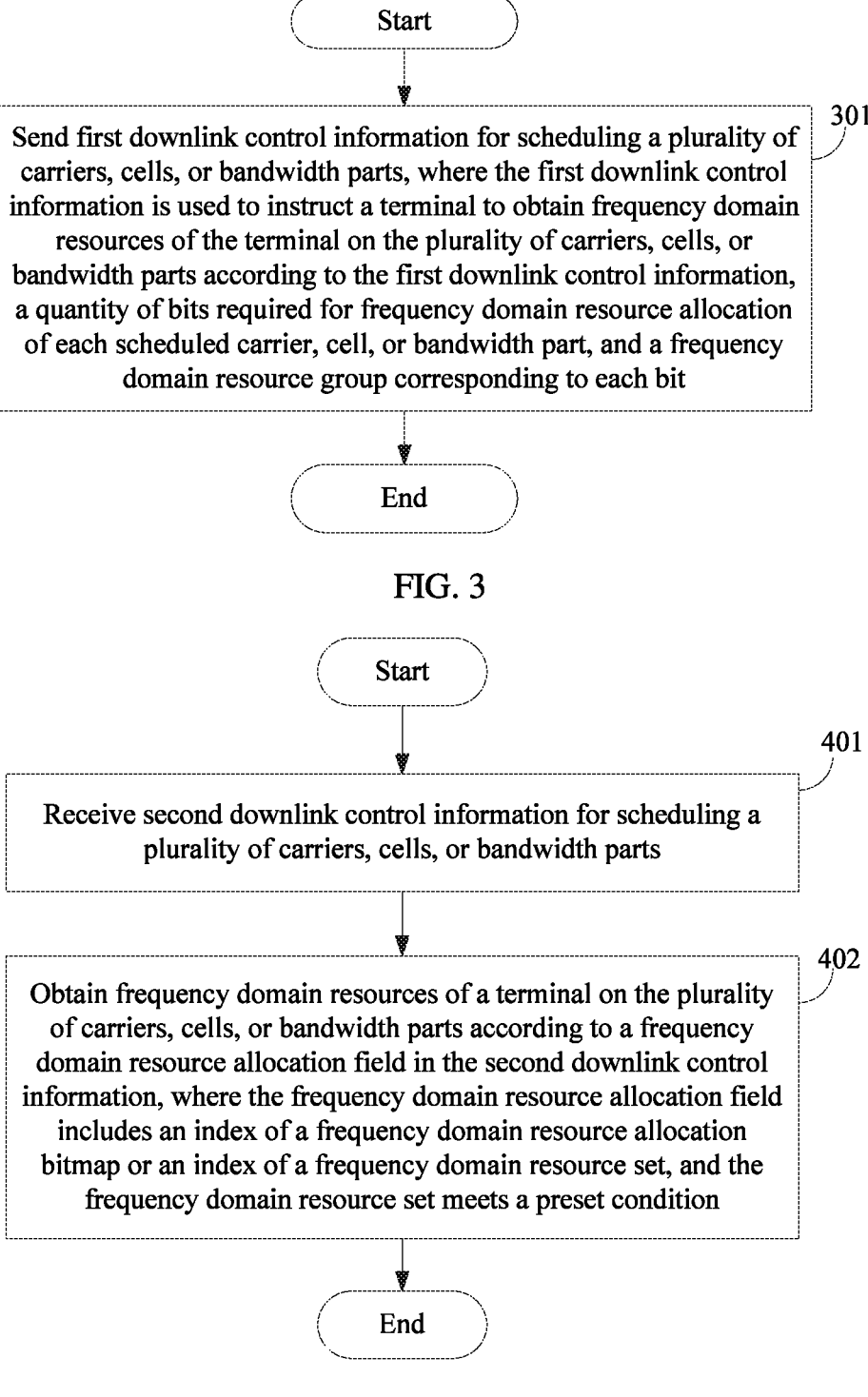
FIG. 3 is a second flowchart of a frequency domain resource allocation method according to an embodiment of the present application.
FIG. 4 is a third flowchart of a frequency domain resource allocation method according to an embodiment of the present application.

To facilitate understanding of embodiments of the present application, the following technical points are first described:

(1) Downlink Frequency Domain Resource Allocation in NR

In NR, there are two types of resource blocks (RB): a physical resource block (PRB) and a virtual resource block (VRB). For frequency domain resources of a physical downlink shared channel (PDSCH) with a bandwidth of $$N_{BWP}^{size},$$

there are $$N_{BWP}^{size}$$

VRBs and PRBs numbered from 0 to $$N_{BWP}^{size} - 1.$$

In resource allocation of the PDSCH, there are two VRB-to-PRB mapping modes: non-interleaved and interleaved.

Frequency domain resource allocation of a PDSCH in NR is indicated by a frequency domain resource allocation (FDRA) field of DCI, that is, an index value of a VRB of the PDSCH in a downlink bandwidth part (BWP).

Two resource allocation types are supported: Type 0 (discontinuous frequency domain resource allocation) and Type 1 (continuous frequency domain resource allocation).

Only the Type 1 frequency domain resource allocation type is supported by DCI 1_0, and one bit indicates a mapping between a VRB to a PRB.

The Type 0 or Type 1 frequency domain resource allocation type can be supported by DCI 1_1, and a higher layer may be configured as Type 0 or Type 1, or a higher layer may be configured as a dynamic switch mode and a resource allocation type is indicated by using high 1 bit of a FDRA field of DCI 1_1. If the higher layer configuration does not support an interleaved mode of VRB-to-PRB mapping, or the higher layer configuration only supports the Type 0 resource allocation type, DCI 1_1 is a bit for indicating non-interleaved VRB-to-PRB mapping and non VRB-to-PRB mapping. Otherwise, the VRB-to-PRB mapping bit indicates the non-interleaved or interleaved mode.

For Type 0 and Type 1 resource allocation methods, refer to the following uplink and downlink frequency domain resource allocation schemes in NR.

(2) Introduction to Two Resource Allocation Types: Type 0 and Type 1:

Type 0:

Resource blocks in a target uplink/downlink BWP for resource allocation are classified into a plurality of resource block groups (RBG), and each RBG corresponds to a set of a maximum of P consecutive VRBs, where P is a quantity of resource blocks included in the target uplink/downlink BWP based on a higher-level parameter configuration (indicating which column in Table 1 is used, that is, a configuration 1 or a configuration 2).

5

TABLE 1

| Nominal RBG size P | | |
|---|---|---|
| Carrier bandwidth part size | Configuration 1 | Configuration 2 |
| 1-36 | 2 | 4 |
| 37-72 | 4 | 8 |
| 73-144 | 8 | 16 |
| 145-275 | 16 | 16 |

A bitmap is used by an FDRA field of DCI format 0_1/1_1 to indicate whether each RBG in the target uplink BWP is allocated for the terminal. Each bit in the bitmap is in a one-to-one correspondence with each RBG in the target uplink/downlink BWP. When a bit in the bitmap is set to 1, it indicates that the corresponding RBG is allocated for the terminal, that is, all resource blocks included in the RBG are allocated for the terminal.

DCI Format 0_0/1_0 does not support the uplink resource allocation type 0.

Type 1

Assuming that a starting VRB number in the VRB set is $RB_{start}$ (a local number within the target uplink BWP) and a quantity of continuous allocated VRBs is $L_{RBs}$, a resource indication value (RIV) is calculated based on the following formula:

If $$(L_{RBs} - 1) \le \lfloor N_{BWP}^{size}/2 \rfloor, RIV = N_{BWP}^{size}(L_{RBs} - 1) + RB_{start}.$$

Otherwise, $$RIV = N_{BWP}^{size}(N_{BWP}^{size} - L_{RBs} + 1) + (N_{BWP}^{size} - 1 - RB_{start}).$$

$$N_{BWP}^{size}$$

is a quantity of VRBs included in the target uplink BWP, and $L_{RBs} \ge 1$ and does not exceed $$N_{BWP}^{size} - RB_{start}.$$

An RIV is indicated in an "FDRA" field of DCI Format 0_0/0_1/1_0/1_1, to indicate an allocated VRB set to the terminal.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application shall fall within the protection scope of the present application.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present application, the word such as "example" or "for example" is used to represent giving an example, an illustration, or a description. Any embodiment or design scheme described as an "example" in the embodiments of the present application should not be explained as being more preferred or having more advantages than another embodiment or design scheme.

The technology described in this specification is not limited to a Long Term Evolution (LTE)/LTE-Advanced (LTE-A) system, and can also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system.

The terms "system" and "network" are often used interchangeably. The CDMA system may implement wireless technologies such as CDMA2000 and universal terrestrial radio access (UTRA). UTRA includes wideband CDMA (WCDMA) and other CDMA variants. The TDMA system can implement radio technologies such as global system for mobile communications (GSM). The OFDMA system can implement radio technologies such as ultra-mobile broadband (UMB), evolved-UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (for example, LTE-A) are new UMTS versions using E-UTRA. UTRA, E-UTRA, UMTS, LTE, LTE-A, and GSM are described in the literature from an organization called 3rd Generation Partnership Project (3GPP). CDMA2000 and UMB are described in the literature from an organization called "3rd Generation Partnership Project 2" (3GPP2). The technologies described herein can be used both in the systems and radio technologies mentioned above, and can also be used in other systems and radio technologies.

The embodiments of the present application are described below with reference to the accompanying drawings. A frequency domain resource allocation method and a device provided in the embodiments of the present application may be applied to a wireless communications system. Referring to FIG. 1, FIG. 1 is a schematic architectural diagram of a communications system according to an embodiment of the present application. As shown in FIG. 1, the wireless communications system may include a network device 11 and a terminal 12. The terminal 12 may be denoted as UE 12, and the terminal 12 may communicate (transmit signaling or transmit data) with the network device 11. In actual application, a connection between the devices may be a wireless connection. For ease of visually indicating a connection relationship between the devices, solid lines are used for illustration in FIG. 1.

The network device 11 provided in the embodiments of the present application may be a base station, and the base station may be a commonly used base station, or may be an evolved base station (eNB), or may be a network device in a 5G system (for example, a next generation base station (gNB) or a transmission and reception point (TRP)).

The terminal 12 provided in the embodiments of the present application may be a mobile phone, a tablet computer, a notebook computer, an ultra-mobile personal computer (UMPC), a netbook, a personal digital assistant (PDA), a mobile internet device (MID), a wearable device, an in-vehicle device, or the like.

Usually, in a scenario in which a plurality of carriers, cells, or bandwidth parts (BWP) are scheduled by using one piece of DCI, the large quantity of bits are required for frequency domain resource allocation. If the plurality of carriers, cells, or BWPs separately use respective frequency domain resource allocation fields, overheads of the frequency domain resource allocation fields are heavy and a final size of the DCI may be excessively large.

Referring to FIG. 2, an embodiment of the present application provides a frequency domain resource allocation method. The method is performed by a terminal, and includes step 201 and step 202.

Step 201: Receive first downlink control information for scheduling a plurality of carriers, cells, or bandwidth parts (or referred to as active BWPs).

Step 202: Obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

It should be noted that in the following example, a frequency domain resource is an RB, a frequency domain resource group is an RBG, and a frequency domain resource group size is an RBG size. However, this is not limited thereto.

For example, an RBG size is determined according to a total RB quantity of the plurality of carriers, cells, or BWPs scheduled by using the first DCI or according to an RB quantity of each carrier, cell, or BWP, and Type 0 frequency domain resource allocation of each carrier, cell, or BWP is indicated according to the RBG size, or Type 0 frequency domain resource allocation of the plurality of carriers, cells, or BWPs is jointly indicated.

In some implementations, before step 202, the method shown in FIG. 2 may further include: determining a frequency domain resource group size of the plurality of carriers, cells, or bandwidth parts; and obtaining, according to the frequency domain resource group size, the quantity of bits required for frequency domain resource allocation of each scheduled carrier, cell, or bandwidth part and/or the frequency domain resource group corresponding to each bit.

Optionally, the frequency domain resource group size of the plurality of carriers, cells, or bandwidth parts is configured by a network side; or the frequency domain resource group size of the plurality of carriers, cells, or bandwidth parts are obtained according to a correspondence between a frequency domain resource quantity and a frequency domain resource group size and a first quantity, where the first quantity includes one or more of:

(1) a total frequency domain resource quantity of the plurality of carriers, where the total frequency domain resource quantity of the plurality of carriers is a sum of frequency domain resource quantities of the carriers;

(2) a total frequency domain resource quantity of the plurality of cells, where the total frequency domain resource quantity of the plurality of cells is a sum of frequency domain resource quantities of the cells;

(3) a total frequency domain resource quantity of the plurality of bandwidth parts, where the total frequency domain resource quantity of the plurality of bandwidth parts is a sum of frequency domain resource quantities of the bandwidth parts;

(4) a maximum frequency domain resource quantity or a minimum frequency domain resource quantity of at least a part of carriers in the plurality of carriers;

(5) a maximum frequency domain resource quantity or a minimum frequency domain resource quantity of at least a part of cells in the plurality of cells; or (6) a maximum frequency domain resource quantity or a minimum frequency domain resource quantity of at least a part of bandwidth parts in the plurality of bandwidth parts.

With reference to solution 1 to solution 3, the following describes how the terminal reduces overheads of Type 0 frequency domain resource allocation in a scenario in which a plurality of carriers, cells, or BWPs are scheduled by using one piece of DCI.

Solution 1: An RBG size P (a quantity of included RBs) is determined according to a total RB quantity of the plurality of carriers, cells, or active BWPs scheduled by using the first DCI or a maximum/minimum RB quantity in N carriers, cells, or active BWPs, and a correspondence between an RB quantity and an RBG size (it should be noted that, the correspondence is different from a correspondence with scheduling of a single carrier, for example, a new RB size range or a new RBG size is introduced) and is used as a granularity (that is, an RB quantity represented by 1 bit in a bitmap) for indication of frequency domain resource allocation of each carrier, cell, or active BWP, and the quantity of bits required for frequency domain resource allocation of each carrier, cell, or active BWP and/or the frequency domain resource group corresponding to each bit are/is calculated.

In this case, a size of a frequency domain resource allocation indication field is $\Sigma N_i$, where $N_i$ is a size of a frequency domain resource allocation bitmap determined based on an RBG size P of the i-th carrier, cell, or active BWP, and i is a natural number.

It can be understood that the RBG size P may be configured by the network side, for example, configured by using radio resource control (RRC).

Solution 2: An RBG size of each carrier, cell, or active BWP is determined according to an RB quantity of each carrier, cell, or active BWP scheduled by using the first DCI, and the determined RBG size is scaled according to a predefined or RRC-configured scaling coefficient or according to a quantity of carriers, cells, or active BWPs scheduled by using the first DCI and is used as a granularity (that is, an RB quantity represented by 1 bit in a bitmap) for indication of frequency domain resource allocation of each carrier, cell, or active BWP, and the quantity of bits required for frequency domain resource allocation of each carrier, cell, or active BWP and/or the frequency domain resource group corresponding to each bit are/is calculated.

In this case, a size of a frequency domain resource allocation indication field is $\Sigma N_i$, where $N_i$ is a size of a frequency domain resource allocation bitmap determined based on an RBG size P of the i-th carrier, cell, or active BWP, and i is a natural number.

In some implementations of the solution 2, before step 202, the method shown in FIG. 2 may further include: obtaining a frequency domain resource group size of each scheduled carrier, cell, or bandwidth part according to a frequency domain resource quantity of each scheduled carrier, cell, or bandwidth part; performing scaling processing on the frequency domain resource group size of each scheduled carrier, cell, or bandwidth part; and obtaining, according to a scaled frequency domain resource group size of each scheduled carrier, cell, or bandwidth part, the quantity of bits required for frequency domain resource allocation of each scheduled carrier, cell, or bandwidth part and/or the frequency domain resource group corresponding to each bit.

Solution 3: The RBG size is determined according to the total RB quantity of the plurality of carriers, cells, or active BWPs scheduled by using the first DCI or a maximum or minimum RB quantity in N (N is greater than or equal to 1) carriers, and a correspondence between an RB quantity and an RBG size (it should be noted that, the correspondence is different from a correspondence with scheduling of a single carrier, for example, a new RB size range or a new RBG size is introduced), and then Type 0 frequency domain resource allocation of the plurality of carriers, cells, or BWPs is jointly indicated according to the RBG size, for example, it is indicated that continuous fragmented RBGs on two BWPs share 1 bit.

It can be understood that the RBG size may be configured by the network side, for example, configured by using RRC.

In some implementations, Type 0 frequency domain resources allocated for the terminal on the plurality of carriers, cells, or bandwidth parts include any one of:

(1) Type 0 frequency domain resources jointly allocated for the terminal on the plurality of carriers;

(2) Type 0 frequency domain resources jointly allocated for the terminal on the plurality of cells;

(3) Type 0 frequency domain resources jointly allocated for the terminal on the plurality of bandwidth parts;

(4) Type 0 frequency domain resources allocated for the terminal on each of the plurality of carriers;

(5) Type 0 frequency domain resources allocated for the terminal on each of the plurality of cells; or (6) Type 0 frequency domain resources allocated for the terminal on each of the plurality of bandwidth parts.

In this embodiment of the present application, in a scenario in which a plurality of carriers, cells, or BWPs are scheduled by using one piece of DCI, resource overheads of a control channel can be reduced while same scheduling flexibility is maintained, thereby improving demodulation performance of the control channel and effective coverage of a system.

Referring to FIG. 3, an embodiment of the present application further provides a frequency domain resource allocation method. The method may be performed by a network device, and includes step 301.

Step 301: Send first downlink control information for scheduling a plurality of carriers, cells, or bandwidth parts.

The first downlink control information is used to instruct a terminal to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

In some implementations, before step 301, the method shown in FIG. 3 may further include:

determining the quantity of bits required for frequency domain resource allocation of each scheduled carrier, cell, or bandwidth part, and the frequency domain resource group corresponding to each bit.

In some implementations, before step 301, the method shown in FIG. 3 may further include: determining a frequency domain resource group size of the plurality of carriers, cells, or bandwidth parts; and obtaining, according to the frequency domain resource group size, the quantity of bits required for frequency domain resource allocation of each scheduled carrier, cell, or bandwidth part and/or the frequency domain resource group corresponding to each bit.

For example, the network device configures frequency domain resource size of the plurality of carriers, cells, or bandwidth parts by using RRC, and the network device determines, according to the frequency domain resource size, the quantity of bits required for frequency domain resource allocation of each scheduled carrier, cell, or bandwidth part, and the frequency domain resource group corresponding to each bit.

Alternatively, the network device obtains the frequency domain resource group size of the plurality of carriers, cells, or bandwidth parts according to a first quantity and a correspondence between a frequency domain resource quantity and a frequency domain resource group size, where the first quantity includes one or more of:

a total frequency domain resource quantity of the plurality of carriers;

a total frequency domain resource quantity of the plurality of cells;

a total frequency domain resource quantity of the plurality of bandwidth parts;

a maximum frequency domain resource quantity or a minimum frequency domain resource quantity of at least a part of carriers in the plurality of carriers;

a maximum frequency domain resource quantity or a minimum frequency domain resource quantity of at least a part of cells in the plurality of cells; or a maximum frequency domain resource quantity or a minimum frequency domain resource quantity of at least a part of bandwidth parts in the plurality of bandwidth parts.

With reference to solution 1 to solution 3, the following describes how the network device reduces overheads of Type 0 frequency domain resource allocation in a scenario in which a plurality of carriers, cells, or BWPs are scheduled by using one piece of DCI.

Solution 1: An RBG size P (a quantity of included RBs) is determined according to a total RB quantity of the plurality of carriers, cells, or active BWPs scheduled by using the first DCI or a maximum/minimum RB quantity in N carriers, cells, or active BWPs, and a correspondence between an RB quantity and an RBG size (it should be noted that, the correspondence is different from a correspondence with scheduling of a single carrier, for example, a new RB size range or a new RBG size is introduced) and is used as a granularity (that is, an RB quantity represented by 1 bit in a bitmap) for indication of frequency domain resource allocation of each carrier, cell, or active BWP, and the quantity of bits required for frequency domain resource allocation of each carrier, cell, or active BWP and/or the frequency domain resource group corresponding to each bit are/is calculated.

In this case, a size of a frequency domain resource allocation indication field is $\Sigma N_i$, where $N_i$ is a size of a frequency domain resource allocation bitmap determined based on an RBG size P of the i-th carrier, cell, or active BWP, and i is a natural number.

It can be understood that the RBG size P may be configured by the network side, for example, configured by using radio resource control (RRC).

Solution 2: An RBG size of each carrier, cell, or active BWP is determined according to an RB quantity of each carrier, cell, or active BWP scheduled by using the first DCI, and the determined RBG size is scaled according to a predefined or RRC-configured scaling coefficient or according to a quantity of carriers, cells, or active BWPs scheduled by using the first DCI and is used as a granularity (that is, an RB quantity represented by 1 bit in a bitmap) for indication of frequency domain resource allocation of each carrier or active BWP, and the quantity of bits required for frequency domain resource allocation of each carrier, cell, or active BWP and/or the frequency domain resource group corresponding to each bit are/is calculated.

In this case, a size of a frequency domain resource allocation indication field is $\Sigma Ni$, where Ni is a size of a frequency domain resource allocation bitmap determined based on an RBG size P of the i-th carrier, cell, or active BWP, and i is a natural number.

In some implementations of the solution 2, before step 301, the method shown in FIG. 3 may further include:

obtaining a frequency domain resource group size of a carrier, cell, or bandwidth part according to a frequency domain resource quantity of the carrier, cell, or bandwidth part; performing scaling processing on the frequency domain resource group size of the carrier, cell, or bandwidth part; and obtaining, according to a scaled frequency domain resource group size of the carrier, cell, or bandwidth part, the quantity of bits required for frequency domain resource allocation of the carrier, cell, or bandwidth part and/or the frequency domain resource group corresponding to each bit.

Solution 3: The RBG size is determined according to the total RB quantity of the plurality of carriers, cells, or active BWPs scheduled by using the first DCI or a maximum or minimum RB quantity in N (N is greater than or equal to 1) carriers, and a correspondence between an RB quantity and an RBG size (it should be noted that, the correspondence is different from a correspondence with scheduling of a single carrier, for example, a new RB size range or a new RBG size is introduced), and then Type 0 frequency domain resource allocation of the plurality of carriers, cells, or BWPs is jointly indicated according to the RBG size, for example, it is indicated that continuous fragmented RBGs on two BWPs share 1 bit.

It can be understood that the RBG size may be configured by the network side, for example, configured by using RRC.

In some implementations, the first downlink control information is used to indicate any one of:

Type 0 frequency domain resources jointly allocated for the terminal on the plurality of carriers;

Type 0 frequency domain resources jointly allocated for the terminal on the plurality of cells;

Type 0 frequency domain resources jointly allocated for the terminal on the plurality of bandwidth parts;

Type 0 frequency domain resources allocated for the terminal on each of the plurality of carriers;

Type 0 frequency domain resources allocated for the terminal on each of the plurality of cells; or Type 0 frequency domain resources allocated for the terminal on each of the plurality of bandwidth parts.

In this embodiment of the present application, in a scenario in which a plurality of carriers, cells, or BWPs are scheduled by using one piece of DCI, resource overheads of a control channel can be reduced while same scheduling flexibility is maintained, thereby improving demodulation performance of the control channel and effective coverage of a system.

Referring to FIG. 4, an embodiment of the present application further provides a frequency domain resource allocation method. The method is performed by a terminal, and includes step 401 and step 402.

Step 401: Receive second downlink control information for scheduling a plurality of carriers, cells, or bandwidth parts.

Step 402: Obtain frequency domain resources of the terminal on the plurality of carriers, cells, or bandwidth parts according to a frequency domain resource allocation field in the second downlink control information.

The frequency domain resource allocation field includes an index corresponding to a frequency domain resource allocation bitmap or an index of a frequency domain resource set, and the frequency domain resource set meets a preset condition.

Solution a: The frequency domain resource allocation field includes an index corresponding to a frequency domain resource allocation bitmap.

In some implementations of the solution a, the method includes:

receiving a resource indication value list configured by a network device for each scheduled carrier, cell, or bandwidth part, where the index represents a location of the frequency domain resource allocation bitmap in the resource indication value list. It can be understood that the index may be implicitly included, one RIV list is configured, and the location of the frequency domain resource allocation bitmap in the RIV list is the index.

In some implementations of the solution a, a size of the frequency domain resource allocation field is related to a quantity of frequency domain resource allocation bitmaps in the resource indication value list configured for each scheduled carrier, cell, or bandwidth part.

In some implementations of the solution a, the method includes:

receiving a resource indication value list jointly configured by a network device for the plurality of carriers, cells, or bandwidth parts, where the index represents a location of the frequency domain resource allocation bitmap in the jointly configured resource indication value list.

In some implementations of the solution a, a size of the frequency domain resource allocation field is related to a quantity of frequency domain resource allocation bitmaps in the jointly configured resource indication value list.

In some implementations of the solution a, the frequency domain resource allocation bitmap indicates frequency domain resources allocated for the terminal on one scheduled carrier, cell, or bandwidth part, or indicates frequency domain resources jointly allocated for the terminal on the plurality of carriers, cells, or bandwidth parts.

That is, in the solution a, RRC configures an RIV list corresponding to a required bitmap code point, and DCI performs frequency domain resource indication by using an index corresponding to the bitmap code point.

(1) If an RIV list is separately configured for one or more scheduled carriers, cells, or BWPs through RRC, a size of an FDRA field required for scheduling each carrier, cell, or BWP is calculated according to a quantity of bitmap code points in each configured RIV list.

(2) If an RIV list is jointly configured for a plurality of scheduled carriers, cells, or BWPs through RRC, a size of an FDRA field required for scheduling the plurality of carriers, cells, or BWPs is calculated according to a quantity of bitmap code points in the jointly configured RIV list.

Solution b: The frequency domain resource allocation field includes an index of a frequency domain resource set, where the frequency domain set meets a preset condition.

In some implementations of the solution b, the preset condition includes one or more of:

(1) a quantity of frequency domain resources in the frequency domain resource set being greater than or equal to a first preset value, where for example, the first preset value may be predefined or configured through RRC;

(2) a ratio of the quantity of frequency domain resources in the frequency domain resource set to a quantity of allocable frequency domain resources on a carrier, cell, or bandwidth part being greater than or equal to a second preset value, where for example, the second preset value may be predefined or configured through RRC, for example, 50%; or (3) frequency domain resources in the frequency domain resource set being discontinuous frequency domain resources.

In some implementations of the solution b, a size of the frequency domain resource allocation field is related to a quantity of frequency domain resource sets, that is, a quantity of bits a frequency domain resource allocation field required by the carrier, the cell, or the BWP is calculated according to a quantity of RB sets that meet the preset condition.

In some implementations of the solution b, the index indicates that the frequency domain resource set is arranged in ascending order or descending order according to a length of a corresponding bitmap.

That is, in the solution b, the size of the frequency domain resource allocation field is determined by using a quantity of frequency domain resource allocation bitmaps that meet the preset condition, and the frequency domain resource allocation bitmap that meets the preset condition is numbered to obtain an index of the bitmap. An index in DCI received by the terminal corresponds to a corresponding frequency domain resource allocation bitmap, to obtain allocated frequency domain resources on the plurality of carriers, cells, or bandwidth parts. That is, a mapping relationship among an index→a bitmap→a frequency domain resource is specified in a protocol, and both the terminal and the network use the mapping relationship to receive DCI to obtain the allocated frequency domain resources on the plurality of carriers, cells, or bandwidth parts, or send DCI to schedule the frequency domain resources on the plurality of corresponding carriers, cells, or bandwidth parts.

In this embodiment of the present application, candidates of frequency domain resource allocation are properly restricted. In this way, in a scenario in which a plurality of carriers, cells, or BWPs are scheduled by using one piece of DCI, resource overheads of a control channel can be reduced while same scheduling flexibility is maintained, thereby improving demodulation performance of the control channel and effective coverage of a system.

Referring to FIG. 5, an embodiment of the present application further provides a frequency domain resource allocation method. The method is performed by a network device, and includes step 501.

Step 501: Send second downlink control information for scheduling a plurality of carriers, cells, or bandwidth parts.

A frequency domain resource allocation field in the second downlink control information includes an index of a frequency domain resource allocation bitmap or an index of a frequency domain resource set, and the frequency domain resource set meets a preset condition.

Solution a: The frequency domain resource allocation field includes an index of a frequency domain resource allocation bitmap.

In some implementations of the solution a, the method further includes: receiving a resource indication value list configured for each scheduled carrier, cell, or bandwidth part, where the index represents a location of the frequency domain resource allocation bitmap in the resource indication value list.

In some implementations of the solution a, a size of the frequency domain resource allocation field is related to a quantity of frequency domain resource allocation bitmaps in the resource indication value list configured for each carrier, cell, or bandwidth part.

In some implementations of the solution a, the method further includes: receiving a resource indication value list jointly configured for the plurality of carriers, cells, or bandwidth parts, where the index represents a location of the frequency domain resource allocation bitmap in the jointly configured resource indication value list.

In some other implementations of the solution a, a size of the frequency domain resource allocation field is related to a quantity of frequency domain resource allocation bitmaps in the jointly configured resource indication value list.

In some implementations of the solution a, the frequency domain resource allocation bitmap indicates a frequency domain resource allocated for the terminal on one carrier, cell, or bandwidth part, or indicates frequency domain resources jointly allocated for the terminal on the plurality of carriers, cells, or bandwidth parts.

That is, in the solution a, RRC configures an RIV list corresponding to a required bitmap code point, and DCI performs frequency domain resource indication by using an index corresponding to the bitmap code point.

(1) If an RIV list is separately configured for one or more scheduled carriers, cells, or BWPs through RRC, a size of an FDRA field required for scheduling each carrier, cell, or BWP is calculated according to a quantity of code points in each configured RIV list.

(2) If an RIV list is jointly configured for a plurality of scheduled carriers, cells, or BWPs through RRC, a size of an FDRA field required for scheduling the plurality of carriers, cells, or BWPs is calculated according to a quantity of bitmap code points in the jointly configured RIV list.

Solution b: The frequency domain resource allocation field includes an index of a frequency domain resource set, where the frequency domain set meets a preset condition.

In some implementations of the solution b, the preset condition includes one or more of:

(1) a quantity of frequency domain resources in the frequency domain resource set being greater than or equal to a first preset value, where for example, the first preset value may be predefined or configured through RRC;

(2) a ratio of the quantity of frequency domain resources in the frequency domain resource set to a quantity of allocable frequency domain resources on a carrier, cell, or bandwidth part being greater than or equal to a second preset value, where for example, the second preset value may be predefined or configured through RRC, for example, 50%; or (3) frequency domain resources in the frequency domain resource set being discontinuous frequency domain resources.

In some implementations of the solution b, a size of the frequency domain resource allocation field is related to a quantity of frequency domain resource sets, that is, a quantity of bits a frequency domain resource allocation field required by the carrier, the cell, or the BWP is calculated according to a quantity of RB sets that meet the preset condition.

In some implementations of the solution b, the index indicates that the frequency domain resource set is arranged in ascending order or descending order according to a length of a corresponding bitmap.

In this embodiment of the present application, candidates of frequency domain resource allocation are properly restricted. In this way, in a scenario in which a plurality of carriers, cells, or BWPs are scheduled by using one piece of DCI, resource overheads of a control channel can be reduced while same scheduling flexibility is maintained, thereby improving demodulation performance of the control channel and effective coverage of a system.

The following describes implementations of the present application with reference to Embodiment 1, Embodiment 2, and Embodiment 3.

Embodiment 1

When I carriers, cells, or BWPs (I>1) are scheduled by using DCI, an RB quantity of the i-th carrier or BWP is Ni, and a total RB quantity of the I scheduled carriers, cells, or BWPs is calculated as $\Sigma Ni$. In this case, an RBG size for scheduling the i-th carrier, cell, or BWP is the same. The RBG size is determined according to the calculated value $\Sigma Ni$ and an RRC configuration based on Table 2.

It should be noted that, different from a configuration table for scheduling a single carrier, Table 2 may be a predefined new table in a protocol. For example, a new BWP size, a new RBG size, or a different RB range is configured in the new table.

An RBG corresponding to each bit and a required bit quantity are obtained on the i-th carrier, cell, or BWP according to the determined RBG size, and are separately indicated in the DCI.

TABLE 2

| RBG size | | |
| --- | --- | --- |
| Carrier Bandwidth Part Size | Configuration 1 | Configuration 2 |
| 1-72 | 2 | 4 |
| 72-144 | 4 | 8 |
| 145-275 | 8 | 16 |
| 276 -550 | 16 | 16 |

Optionally, the RBG size may be explicitly configured by using RRC.

Embodiment 2

When I carriers, cells, or BWPs (I>1) are scheduled by using DCI, an RB quantity of the i-th carrier, cell, or BWP is Ni. An RBG size is determined according to Ni and an configuration RRC configuration based on Table 2 to obtain RBGi, and RBGi is scaled according to a predefined scaling coefficient or a scaling coefficient configuration through RRC, for example, the scaling coefficient is K to obtain a new RBG size of the i-th carrier, cell, or BWP: RBG'i=K*RBGi. An RBG corresponding to each bit and a required bit quantity are obtained on the i-th carrier, cell, or BWP according to RBG'i, and are separately indicated in the DCI.

Embodiment 3

RRC configures a table corresponding to a required bitmap code point (frequency domain resource allocation bitmap), and DCI performs frequency domain resource indication by using an index corresponding to the bitmap code point. For example, if an RB quantity of one BWP is 20, and an RBG size is 2, 10 bits are required to indicate Type 0 frequency domain resource allocation, and if RRC configures a correspondence between a bitmap code point and an index, 2 bits are used in the DCI to indicate a value of the FDRA.

TABLE 3

| Correspondence between a bitmap code point and an index | |
| --- | --- |
| Index | Type 0 FDRA |
| 0 | 1010101010 |
| 1 | 0101010101 |
| 2 | 1101001001 |
| 3 | 1001001011 |

Embodiment 4

It is stipulated that a frequency domain RB for scheduling needs to be greater than half of a total RB quantity of a BWP. Type 0 FDRA values that meet this condition are sorted, and are indicated by sorted indexes. For example, if an RB quantity of one BWP is 10, and an RBG size is 2, Type 0 FDRA that meets the condition is 00111, 01101, 01110, 01111, 10011, 10101, 10110, 10111, 11001, 11010, 11011, 11100, 11101, 11110, and 11111, which need to be indicated by 4 bits. For example, FDRA represented by 0000 is 00111.

Referring to FIG. 6, an embodiment of the present application further provides a terminal, and the terminal 600 includes:

a first receiving module 601, configured to receive first downlink control information for scheduling a plurality of carriers, cells, or bandwidth parts; and a first processing module 602, configured to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

In some implementations, the terminal 600 further includes:

a second processing module, configured to determine a frequency domain resource group size of the plurality of carriers, cells, or bandwidth parts; and a third processing module, configured to obtain, according to the frequency domain resource group size, the quantity of bits required for frequency domain resource allocation of each scheduled carrier, cell, or bandwidth part and/or the frequency domain resource group corresponding to each bit.

Optionally, the frequency domain resource group size of the plurality of carriers, cells, or bandwidth parts is configured by a network side.

Optionally, the second processing module is further configured to obtain the frequency domain resource group size of the plurality of carriers, cells, or bandwidth parts according to a correspondence between a frequency domain resource quantity and a frequency domain resource group size and a first quantity, where the first quantity includes any one of:

a total frequency domain resource quantity of the plurality of carriers;

a total frequency domain resource quantity of the plurality of cells;

a total frequency domain resource quantity of the plurality of bandwidth parts;

a maximum frequency domain resource quantity or a minimum frequency domain resource quantity of at least a part of carriers in the plurality of carriers;

a maximum frequency domain resource quantity or a minimum frequency domain resource quantity of at least a part of cells in the plurality of cells; or a maximum frequency domain resource quantity or a minimum frequency domain resource quantity of at least a part of bandwidth parts in the plurality of bandwidth parts.

In some implementations, the terminal 600 further includes:

a fourth processing module, configured to obtain a frequency domain resource group size of each scheduled carrier, cell, or bandwidth part according to a frequency domain resource quantity of each scheduled carrier, cell, or bandwidth part;

a fifth processing module, configured to perform scaling processing on the frequency domain resource group size of each scheduled carrier, cell, or bandwidth part; and a sixth processing module, configured to obtain according to a scaled frequency domain resource group size of each scheduled carrier, cell, or bandwidth part, the quantity of bits required for frequency domain resource allocation of each scheduled carrier, cell, or bandwidth part and/or the frequency domain resource group corresponding to each bit.

In some implementations, the fifth processing module is further configured to perform scaling processing on the frequency domain resource group size of each scheduled carrier, cell, or bandwidth part according to a scaling coefficient, where the scaling coefficient is agreed in a protocol, or the scaling coefficient is configured by a network side, or the scaling coefficient is obtained according to a quantity of carriers, cells, or bandwidth parts scheduled by using the first downlink control information.

In some implementations, a size of a frequency domain resource allocation indication field of the first downlink control information is $\Sigma N_i$, where $N_i$ is a frequency domain resource allocation bitmap size determined based on a frequency domain resource group size of the i-th scheduled carrier, cell, or bandwidth part, and i is a natural number.

In some implementations, the frequency domain resources of the terminal on the plurality of carriers, cells, or bandwidth parts include any one of:

frequency domain resources jointly allocated for the terminal on the plurality of carriers;

frequency domain resources jointly allocated for the terminal on the plurality of cells;

frequency domain resources jointly allocated for the terminal on the plurality of bandwidth parts;

frequency domain resources allocated for the terminal on each of the plurality of carriers;

frequency domain resources allocated for the terminal on each of the plurality of cells; or frequency domain resources allocated for the terminal on each of the plurality of bandwidth parts.

The terminal provided in this embodiment of the present application may perform the foregoing method embodiment shown in FIG. 2. An implementation principle and a technical effect of the terminal are similar to those of the method embodiment, and details are not described herein again in this embodiment.

Figure 7:
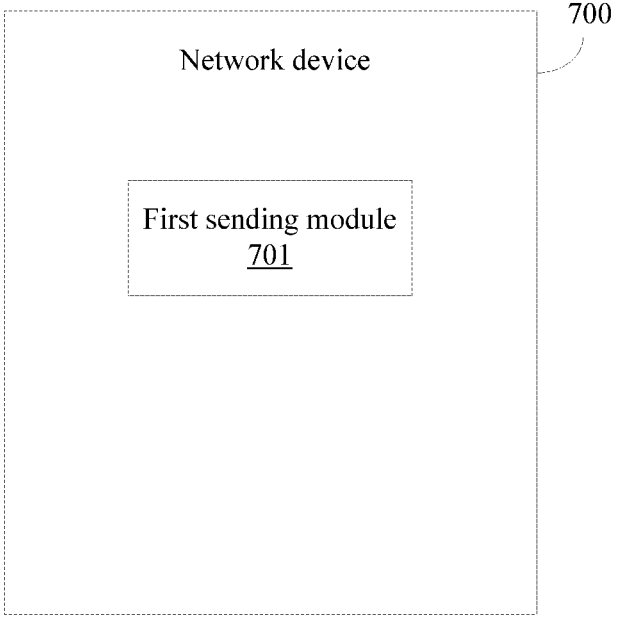
FIG. 7 is a first schematic diagram of a network device according to an embodiment of the present application.

Referring to FIG. 7, an embodiment of the present application further provides a network device, and the network device 700 includes:

a first sending module 701, configured to send first downlink control information for scheduling a plurality of carriers, cells, or bandwidth parts, where the first downlink control information is used to instruct a terminal to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit.

In some implementations, the network device 700 further includes:

a determining module, configured to determine the quantity of bits required for frequency domain resource allocation of each scheduled carrier, cell, or bandwidth part, and the frequency domain resource group corresponding to each bit.

In some implementations, the network device 700 further includes:

an eighth processing module, configured to determine a frequency domain resource group size of the plurality of carriers, cells, or bandwidth parts; and a ninth processing module, configured to obtain, according to the frequency domain resource group size, the quantity of bits required for frequency domain resource allocation of each scheduled carrier, cell, or bandwidth part and/or the frequency domain resource group corresponding to each bit.

Optionally, the eighth processing module is further configured to obtain the frequency domain resource group size of the plurality of carriers, cells, or bandwidth parts according to a correspondence between a frequency domain resource quantity and a frequency domain resource group size and a first quantity, where the first quantity includes any one of:

a total frequency domain resource quantity of the plurality of carriers;

a total frequency domain resource quantity of the plurality of cells;

a total frequency domain resource quantity of the plurality of bandwidth parts;

a maximum frequency domain resource quantity or a minimum frequency domain resource quantity of at least a part of carriers in the plurality of carriers;

a maximum frequency domain resource quantity or a minimum frequency domain resource quantity of at least a part of cells in the plurality of cells; or a maximum frequency domain resource quantity or a minimum frequency domain resource quantity of at least a part of bandwidth parts in the plurality of bandwidth parts.

In some implementations, the network device 700 further includes:

a tenth processing module, configured to obtain a frequency domain resource group size of the carrier, cell, or bandwidth part according to a frequency domain resource quantity of each scheduled carrier, cell, or bandwidth part;

an eleventh processing module, configured to perform scaling processing on the frequency domain resource group size of each scheduled carrier, cell, or bandwidth part; and a twelfth processing module, configured to obtain, according to a scaled frequency domain resource group size of the carrier, cell, or bandwidth part, the quantity of bits required for frequency domain resource allocation of each scheduled carrier, cell, or bandwidth part and/or the frequency domain resource group corresponding to each bit.

In some implementations, the eleventh processing module is further configured to perform scaling processing on the frequency domain resource group size of each scheduled carrier, cell, or bandwidth part according to a scaling coefficient, where the scaling coefficient is agreed in a protocol, or the scaling coefficient is configured by a network side, or the scaling coefficient is obtained according to a quantity of carriers, cells, or bandwidth parts scheduled by using the first downlink control information.

In some implementations, a size of a frequency domain resource allocation indication field of the first downlink control information is $\Sigma Ni$, where $Ni$ is a frequency domain resource allocation bitmap size determined based on a frequency domain resource group size of the i-th scheduled carrier, cell, or bandwidth part, and i is a natural number.

The network device provided in this embodiment of the present application may perform the foregoing method embodiment shown in FIG. 3. An implementation principle and a technical effect of the network device are similar to those of the method embodiment, and details are not described herein again in this embodiment.

Figure 8:
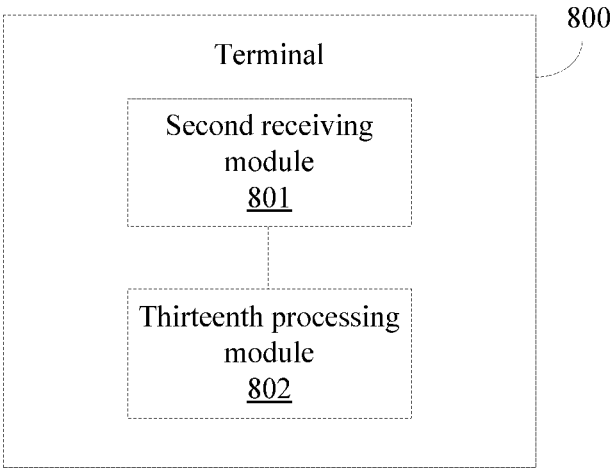
FIG. 8 is a second schematic diagram of a terminal according to an embodiment of the present application.

Referring to FIG. 8, an embodiment of the present application further provides a terminal, and the terminal 800 includes:

a second receiving module 801, configured to receive second downlink control information for scheduling a plurality of carriers, cells, or bandwidth parts; and a thirteenth processing module 802, configured to obtain frequency domain resources of the terminal on the plurality of carriers, cells, or bandwidth parts according to a frequency domain resource allocation field in the second downlink control information, where the frequency domain resource allocation field includes an index corresponding to a frequency domain resource allocation bitmap or an index corresponding to a frequency domain resource set, and the frequency domain resource set meets a preset condition.

In some implementations, the terminal 800 further includes:

a third receiving module, configured to: receive a resource indication value list configured by a network device for each scheduled carrier, cell, or bandwidth part, where the index represents a location of the frequency domain resource allocation bitmap in the resource indication value list; or receive a resource indication value list jointly configured by a network device for the plurality of carriers, cells, or bandwidth parts, where the index represents a location of the frequency domain resource allocation bitmap in the jointly configured resource indication value list.

In some implementations, a size of the frequency domain resource allocation field is related to a quantity of frequency domain resource allocation bitmaps in the resource indication value list configured for each carrier, cell, or bandwidth part; or a size of the frequency domain resource allocation field is related to a quantity of frequency domain resource allocation bitmaps in the jointly configured resource indication value list.

In some implementations, the frequency domain resource allocation bitmap indicates a frequency domain resource allocated for the terminal on one carrier, cell, or bandwidth part, or indicates frequency domain resources jointly allocated for the terminal on the plurality of carriers, cells, or bandwidth parts.

In some implementations, the preset condition includes one or more of:

a quantity of frequency domain resources in the frequency domain resource set being greater than or equal to a first preset value;

a ratio of the quantity of frequency domain resources in the frequency domain resource set to a quantity of allocable frequency domain resources on a carrier, cell, or bandwidth part being greater than or equal to a second preset value; or frequency domain resources in the frequency domain resource set being discontinuous frequency domain resources.

In some implementations, a size of the frequency domain resource allocation field is related to a quantity of frequency domain resource sets.

In some implementations, the index of the frequency domain resource set indicates that the frequency domain resource set is arranged in ascending order or descending order according to a length of a corresponding bitmap.

The terminal provided in this embodiment of the present application may perform the foregoing method embodiment shown in FIG. 4. An implementation principle and a technical effect of the terminal are similar to those of the method embodiment, and details are not described herein again in this embodiment.

Figure 9:
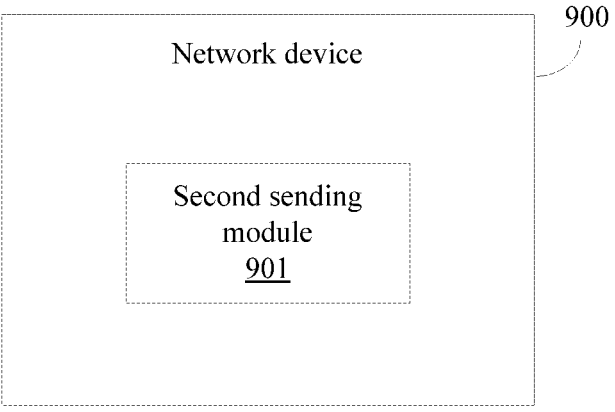
FIG. 9 is a second schematic diagram of a network device according to an embodiment of the present application.

Referring to FIG. 9, an embodiment of the present application further provides a network device, and the network device 900 includes:

a second sending module 901, configured to send second downlink control information for scheduling a plurality of carriers, cells, or bandwidth parts, where a frequency domain resource allocation field in the second downlink control information includes an index of a frequency domain resource allocation bitmap or an index of a frequency domain resource set, and the frequency domain resource set meets a preset condition.

In some implementations, the network device 900 further includes:

a third sending module, configured to: send a resource indication value list configured for each scheduled carrier, cell, or bandwidth part, where the index represents a location of the frequency domain resource allocation bitmap in the resource indication value list; or send a resource indication value list jointly configured for the plurality of carriers, cells, or bandwidth parts, where the index represents a location of the frequency domain resource allocation bitmap in the jointly configured resource indication value list.

In some implementations, a size of the frequency domain resource allocation field is related to a quantity of frequency domain resource allocation bitmaps in the resource indication value list configured for each carrier, cell, or bandwidth part; or a size of the frequency domain resource allocation field is related to a quantity of frequency domain resource allocation bitmaps in the jointly configured resource indication value list.

In some implementations, the preset condition includes one or more of:

a quantity of frequency domain resources in the frequency domain resource set being greater than or equal to a first preset value;

a ratio of the quantity of frequency domain resources in the frequency domain resource set to a quantity of allocable frequency domain resources on a carrier, cell, or bandwidth part being greater than or equal to a second preset value; or frequency domain resources in the frequency domain resource set being discontinuous frequency domain resources.

In some implementations, a size of the frequency domain resource allocation field is related to a quantity of frequency domain resource sets.

In some implementations, the index of the frequency domain resource set indicates that the frequency domain resource set is arranged in ascending order or descending order according to a length of a corresponding bitmap.

The network device provided in this embodiment of the present application may perform the foregoing method embodiment shown in FIG. 5. An implementation principle and a technical effect of the network device are similar to those of the method embodiment, and details are not described herein again in this embodiment.

Figure 10:
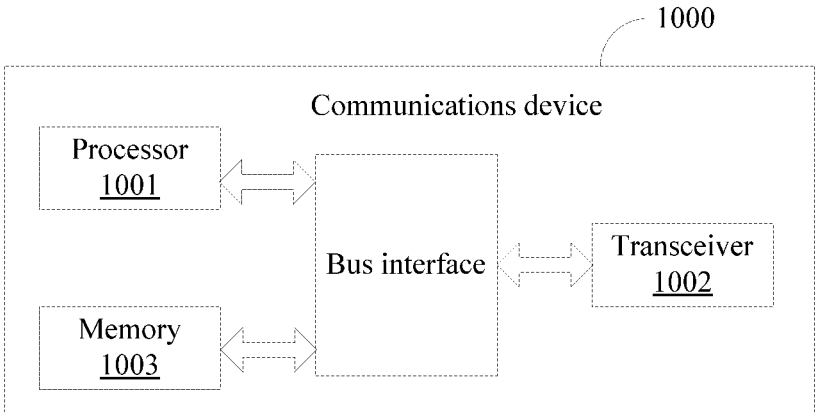
FIG. 10 is a schematic diagram of a communications device according to an embodiment of the present application.

Referring to FIG. 10, FIG. 10 is a structural diagram of a communications device to which the embodiments of the present application are applied. As shown in FIG. 10, the communications device 1000 includes a processor 1001, a transceiver 1002, a memory 1003, and a bus interface.

In an embodiment of the present application, the communications device 1000 further includes a computer program stored in the memory 1003 and executable on the processor 1001, and when the computer program is executed by the processor 1001, the steps in the embodiment shown in FIG. 2, FIG. 3, FIG. 4, or FIG. 5 are implemented.

In FIG. 10, a bus architecture may include any quantity of interconnected buses and bridges. Various circuits of one or more processors represented by the processor 1001 and a memory represented by the memory 1003 are interconnected. The bus architecture may further link various other circuits such as a peripheral device, a voltage regulator, and a power management circuit. These are well known in the art, and therefore are not described in this specification. A bus interface provides an interface. The transceiver 1002 may be a plurality of components. For example, the transceiver 1002 includes a transmitter and a receiver, and provides a unit configured to communicate with various other apparatuses on a transmission medium. It can be understood that the transceiver 1002 is an optional component.

The processor 1001 is responsible for bus architecture management and general processing. The memory 1003 may store data used by the processor 1001 when the processor 1001 performs an operation.

The communications device provided in this embodiment of the present application may perform the foregoing method embodiment shown in FIG. 2, FIG. 3, FIG. 4, or FIG. 5. An implementation principle and a technical effect of the communications device are similar to those of the method embodiments, and details are not described herein again in this embodiment.

An embodiment of the present application further provides a chip, where the chip includes a processor and a communications interface, the communications interface is coupled to the processor, and the processor is configured to execute a program or an instruction to implement the processes of the method embodiment shown in FIG. 2, FIG. 3, FIG. 4, or FIG. 5, and a same technical effect can be achieved. To avoid repetition, details are not described herein again.

It should be understood that the chip mentioned in this embodiment of the present application may also be referred to as a system-level chip, a system chip, a chip system, or an on-chip system chip.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read only memory, or any other form of non-transitory computer-readable storage medium well-known in the art. For example, a storage medium is coupled to the processor, so that the processor can read information from the storage medium or write information into the storage medium. Certainly, the storage medium may be a component of the processor. The processor and the storage medium may be located in an application specific integrated circuit (ASIC). In addition, the ASIC may be located in a core network interface device. Certainly, the processor and the storage medium may exist in the core network interface device as discrete components.

A person skilled in the art should be aware that in the foregoing one or more examples, functions described in the present application may be implemented by hardware, software, firmware, or any combination thereof. When implemented by software, the foregoing functions may be stored in a non-transitory computer-readable medium or transmitted as one or more instructions or code in the non-transitory computer-readable medium. The non-transitory computer-readable medium includes a non-transitory computer storage medium and a communications medium, where the communications medium includes any non-transitory medium that enables a computer program to be transmitted from one place to another. The non-transitory computer storage medium may be any available non-transitory medium accessible to a general-purpose or dedicated computer.

The objectives, technical solutions, and benefits of the present application are described in the foregoing embodiments. It should be understood that the foregoing descriptions are merely embodiments of the present application, but are not intended to limit the protection scope of the present application. Any modification, equivalent replacement, improvement, or the like based on the technical solutions of the present application shall fall within the protection scope of the present application.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. Moreover, the embodiments of the present application may use a form of a computer program product that is implemented on one or more non-transitory computer-usable storage media (including but not limited to a magnetic disk memory, a CD-ROM, an optical memory, and the like) that include computer-usable program code.

The embodiments of the present application are described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, persons skilled in the art can make various modifications and variations to embodiments of the present application without departing from the spirit and scope of the present application. In this way, the present application is intended to cover these modifications and variations provided that they fall within the scope of protection defined by the following claims and their equivalent technologies.

What is claimed is:

1. A frequency domain resource allocation method, performed by a terminal and comprising:
receiving first downlink control information for scheduling a plurality of carriers, cells, or bandwidth parts; and
obtaining frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit;
wherein a size of a frequency domain resource allocation indication field of the first downlink control information is $\Sigma Ni$, wherein Ni is a frequency domain resource allocation bitmap size determined based on a frequency domain resource group size of an i-th scheduled carrier, cell, or bandwidth part, and i is a natural number.

2. The method according to claim 1, wherein the method further comprises:

obtaining a frequency domain resource group size of each scheduled carrier, cell, or bandwidth part according to a frequency domain resource quantity of each scheduled carrier, cell, or bandwidth part;
performing scaling processing on the frequency domain resource group size of each scheduled carrier, cell, or bandwidth part; and
obtaining, according to a scaled frequency domain resource group size of each scheduled carrier, cell, or bandwidth part, the quantity of bits required for frequency domain resource allocation of each scheduled carrier, cell, or bandwidth part and/or the frequency domain resource group corresponding to each bit.

3. The method according to claim 2, wherein the performing scaling processing on the frequency domain resource group size of each scheduled carrier, cell, or bandwidth part comprises:
performing scaling processing on the frequency domain resource group size of each scheduled carrier, cell, or bandwidth part according to a scaling coefficient, wherein
the scaling coefficient is agreed in a protocol, or the scaling coefficient is configured by a network side, or the scaling coefficient is obtained according to a quantity of carriers, cells, or bandwidth parts scheduled by using the first downlink control information.

4. The method according to claim 1, wherein the frequency domain resources of the terminal on the plurality of carriers, cells, or bandwidth parts comprise any one of:
frequency domain resources jointly allocated for the terminal on the plurality of carriers;
frequency domain resources jointly allocated for the terminal on the plurality of cells;
frequency domain resources jointly allocated for the terminal on the plurality of bandwidth parts;
frequency domain resources allocated for the terminal on each of the plurality of carriers;
frequency domain resources allocated for the terminal on each of the plurality of cells; or
frequency domain resources allocated for the terminal on each of the plurality of bandwidth parts.

5. The method according to claim 1, wherein the method further comprises:
determining a frequency domain resource group size of the plurality of carriers, cells, or bandwidth parts; and
obtaining, according to the frequency domain resource group size, the quantity of bits required for frequency domain resource allocation of each scheduled carrier, cell, or bandwidth part and/or the frequency domain resource group corresponding to each bit.

6. The method according to claim 5, wherein the frequency domain resource group size of the plurality of carriers, cells, or bandwidth parts is configured by a network side.

7. The method according to claim 5, wherein the determining a frequency domain resource group size of the plurality of carriers, cells, or bandwidth parts comprises:
obtaining the frequency domain resource group size of the plurality of carriers, cells, or bandwidth parts according to a correspondence between a frequency domain resource quantity and a frequency domain resource group size and a first quantity, wherein
the first quantity comprises any one of:
a total frequency domain resource quantity of the plurality of carriers;
a total frequency domain resource quantity of the plurality of cells;

a total frequency domain resource quantity of the plurality of bandwidth parts;

a maximum frequency domain resource quantity or a minimum frequency domain resource quantity of at least a part of carriers in the plurality of carriers;

a maximum frequency domain resource quantity or a minimum frequency domain resource quantity of at least a part of cells in the plurality of cells; or a maximum frequency domain resource quantity or a minimum frequency domain resource quantity of at least a part of bandwidth parts in the plurality of bandwidth parts.

8. A frequency domain resource allocation method, performed by a terminal and comprising:

receiving second downlink control information for scheduling a plurality of carriers, cells, or bandwidth parts; and obtaining frequency domain resources of the terminal on the plurality of carriers, cells, or bandwidth parts according to a frequency domain resource allocation field in the second downlink control information, wherein the frequency domain resource allocation field comprises an index corresponding to a frequency domain resource allocation bitmap or an index corresponding to a frequency domain resource set, and the frequency domain resource set meets a preset condition;

wherein the method further comprises:

receiving a resource indication value list configured by a network device for each scheduled carrier, cell, or bandwidth part, wherein the index represents a location of the frequency domain resource allocation bitmap in the resource indication value list; or receiving a resource indication value list jointly configured by a network device for the plurality of carriers, cells, or bandwidth parts, wherein the index represents a location of the frequency domain resource allocation bitmap in the jointly configured resource indication value list;

wherein the preset condition comprises one or more of:

a quantity of frequency domain resources in the frequency domain resource set being greater than or equal to a first preset value;

a ratio of the quantity of frequency domain resources in the frequency domain resource set to a quantity of allocable frequency domain resources on a carrier, cell, or bandwidth part being greater than or equal to a second preset value; or frequency domain resources in the frequency domain resource set being discontinuous frequency domain resources.

9. The method according to claim 8, wherein when the resource indication value list is configured by the network device for each scheduled carrier, cell, or bandwidth part, a size of the frequency domain resource allocation field is related to a quantity of frequency domain resource allocation bitmaps in the resource indication value list configured for each scheduled carrier, cell, or bandwidth part.

10. The method according to claim 8, wherein when the resource indication value list is jointly configured by the network device for the plurality of carriers, cells, or bandwidth parts, a size of the frequency domain resource allocation field is related to a quantity of frequency domain resource allocation bitmaps in the jointly configured resource indication value list.

11. The method according to claim 8, wherein the frequency domain resource allocation bitmap indicates frequency domain resources allocated for the terminal on one scheduled carrier, cell, or bandwidth part, or indicates frequency domain resources jointly allocated for the terminal on the plurality of carriers, cells, or bandwidth parts.

12. The method according to claim 8, wherein a size of the frequency domain resource allocation field is related to a quantity of frequency domain resource sets.

13. The method according to claim 8, wherein the index corresponding to the frequency domain resource set indicates that the frequency domain resource set is arranged in ascending order or descending order according to a length of a corresponding bitmap.

14. A network device, comprising a processor, a memory, and a program stored in the memory and executable on the processor, wherein the program, when executed by the processor, causes the network device to perform the following method:

sending first downlink control information for scheduling a plurality of carriers, cells, or bandwidth parts, wherein the first downlink control information is used to instruct a terminal to obtain frequency domain resources of the terminal on the plurality of carriers, cells, or bandwidth parts according to the first downlink control information, a quantity of bits required for frequency domain resource allocation of each scheduled carrier, cell, or bandwidth part, and a frequency domain resource group corresponding to each bit; wherein a size of a frequency domain resource allocation indication field of the first downlink control information is $\Sigma N_i$, wherein $N_i$ is a frequency domain resource allocation bitmap size determined based on a frequency domain resource group size of an i-th scheduled carrier, cell, or bandwidth part, and i is a natural number;

or sending second downlink control information for scheduling a plurality of carriers, cells, or bandwidth parts, wherein a frequency domain resource allocation field in the second downlink control information comprises an index corresponding to a frequency domain resource allocation bitmap or an index corresponding to a frequency domain resource set, and the frequency domain resource set meets a preset condition; wherein the method further comprises:

sending a resource indication value list configured for each scheduled carrier, cell, or bandwidth part, wherein the index represents a location of the frequency domain resource allocation bitmap in the resource indication value list; or sending a resource indication value list jointly configured for the plurality of carriers, cells, or bandwidth parts, wherein the index represents a location of the frequency domain resource allocation bitmap in the jointly configured resource indication value list;

wherein the preset condition comprises one or more of:

a quantity of frequency domain resources in the frequency domain resource set being greater than or equal to a first preset value;

a ratio of the quantity of frequency domain resources in the frequency domain resource set to a quantity of allocable frequency domain resources on a carrier, cell, or bandwidth part being greater than or equal to a second preset value; or frequency domain resources in the frequency domain resource set being discontinuous frequency domain resources.

15. The network device according to claim 14, wherein when the resource indication value list is configured by the network device for each scheduled carrier, cell, or bandwidth part, a size of the frequency domain resource allocation field is related to a quantity of frequency domain resource allocation bitmaps in the resource indication value list configured for each scheduled carrier, cell, or bandwidth part.

16. The network device according to claim 14, wherein when the resource indication value list is jointly configured by the network device for the plurality of carriers, cells, or bandwidth parts, a size of the frequency domain resource allocation field is related to a quantity of frequency domain resource allocation bitmaps in the jointly configured resource indication value list.

17. The network device according to claim 14, wherein a size of the frequency domain resource allocation field is related to a quantity of frequency domain resource sets.

18. The network device according to claim 14, wherein the index corresponding to the frequency domain resource set indicates that the frequency domain resource set is arranged in ascending order or descending order according to a length of a corresponding bitmap.

19. A communications device, comprising a processor, a memory, and a program stored in the memory and executable on the processor, wherein when the program is executed by the processor, steps of the frequency domain resource allocation method according to claim 1 are implemented.

20. A non-transitory computer-readable storage medium, wherein the non-transitory computer-readable storage medium stores a program, and when the program is executed by a processor, steps of the frequency domain resource allocation method according to claim 1 are implemented.

* * * * *